United States Patent
Guggilla et al.

(10) Patent No.: US 10,678,524 B2
(45) Date of Patent: Jun. 9, 2020

(54) RUNTIME STRUCT FIELDS SIZE REDUCTION

(71) Applicant: Intel Corporation, Santa Clara, CA (US)

(72) Inventors: Satish K. Guggilla, Chandler, AZ (US);
Prasad Battini, Lexington, MA (US);
Dmitry Budanov, Cupertino, CA (US);
John Ng, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/922,059

(22) Filed: Mar. 15, 2018

(65) Prior Publication Data
US 2019/0042220 A1 Feb. 7, 2019

(51) Int. Cl.
*G06F 8/41* (2018.01)
*G06F 16/22* (2019.01)

(52) U.S. Cl.
CPC ........ *G06F 8/4434* (2013.01); *G06F 16/2272* (2019.01)

(58) Field of Classification Search
None
See application file for complete search history.

(56) References Cited

U.S. PATENT DOCUMENTS

| | | | | |
|---|---|---|---|---|
| 6,658,492 B1 * | 12/2003 | Kawahara | ............ | G06F 9/44573 717/159 |
| 6,765,245 B2 * | 7/2004 | Bansal | ............ | H01L 27/11807 257/202 |
| 7,343,594 B1 * | 3/2008 | Metzgen | ............ | G06F 17/5054 717/140 |
| 7,671,401 B2 * | 3/2010 | Fang | ............ | G11C 16/0416 257/318 |
| 9,274,710 B1 * | 3/2016 | Oikarinen | ............ | G06F 3/061 |
| 2007/0130114 A1 * | 6/2007 | Li | ............ | G06F 8/4442 |
| 2015/0278089 A1 * | 10/2015 | Uramoto | ............ | G06F 9/454 711/171 |
| 2015/0303202 A1 * | 10/2015 | Sun | ............ | H01L 21/823487 257/392 |
| 2016/0055120 A1 * | 2/2016 | Vorbach | ............ | G06F 9/3001 712/17 |
| 2017/0132000 A1 * | 5/2017 | Voigt | ............ | G06F 8/65 |
| 2019/0042220 A1 * | 2/2019 | Guggilla | ............ | G06F 16/2272 |

OTHER PUBLICATIONS

Ananian, "Data Size Optimizations for Java Programs", 2003, ACM (Year: 2003).*
"Quick reference guide to optimization with Intel C++ and fortan compilers v18", retrieved from software.intel.com/sites/default/files/managed/23/f2/Quick-Reference-Card-Intel-Compilers.pdf, 2017, 11 pages.

* cited by examiner

*Primary Examiner* — Hossain M Morshed
(74) *Attorney, Agent, or Firm* — Jordan IP Law, LLC (57) ABSTRACT

An embodiment of a semiconductor package apparatus may include technology to identify a field of a data structure as a candidate for a size reduction, perform a runtime analysis on the field, and reduce the size of the field based on the runtime analysis. Other embodiments are disclosed and claimed.

25 Claims, 7 Drawing Sheets

| 0    | 8    | 16   | 24   | 32   | 40   | 48   | 56   | ... |
|------|------|------|------|------|------|------|------|-----|
| f1_1 | f2_1 | f3_1 | f1_2 | f2_2 | f3_2 | f1_3 | f2_3 | ... |

FIG. 6A

| 0    | 8    | 12   | 16   | 24   | 28   | 32   | 40   | 44   | 48   | ... |
|------|------|------|------|------|------|------|------|------|------|-----|
| f1_1 | f2_1 | f3_1 | f1_2 | f2_2 | f3_2 | f1_3 | f2_3 | f3_3 | f1_4 | ... |

FIG. 6B

| 0    | 8192 | 16384 |
|------|------|-------|
| f1_1 | f2_1 | f3_1  |
| f1_2 | f2_2 | f3_2  |
| f1_3 | f2_3 | f3_3  |
| ...  | ...  | ...   |

FIG. 7A

| 0    | 8192 | 12288 |
|------|------|-------|
| f1_1 | f2_1 | f3_1  |
| f1_2 | f2_2 | f3_2  |
| f1_3 | f2_3 | f3_3  |
| ...  | ...  | ...   |

RUNTIME STRUCT FIELDS SIZE REDUCTION

TECHNICAL FIELD

Embodiments generally relate to compilers. More particularly, embodiments relate to runtime struct fields size reduction.

BACKGROUND

A compiler may process a computer code source language such as C, C++, C#, PYTHON, etc. to create a suitable executable file for execution on a computing device. The size of the data structures created by the compiler may have an impact on the performance of the code and/or computing device.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
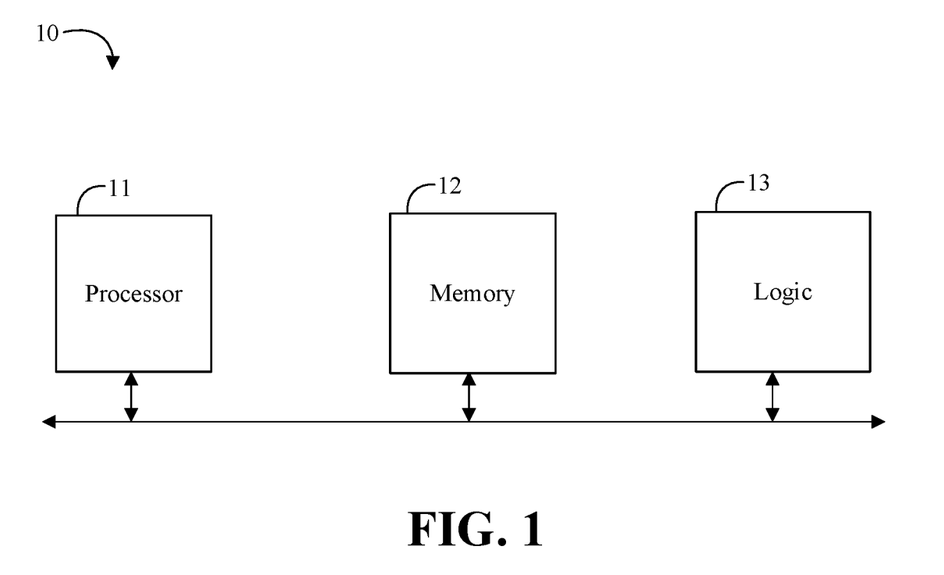
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the processor 11 to identify a field of a data structure as a candidate for a size reduction, perform a runtime analysis on the field, and reduce the size of the field based on the runtime analysis. In some embodiments, the logic 13 may be further configured to perform a runtime range analysis on one or more values assigned to the field. For example, the logic 13 may be configured to determine a minimum value for the one or more values assigned to the field, determine a maximum value for the one or more values assigned to the field, and reduce the size of the field based on the determined minimum and maximum values. In some embodiments, the logic 13 may also be configured to copy the field of the data structure to a reduced size field, and set a flag to indicate that the size of the field of the data structure was reduced. In some embodiments, the logic 13 may additionally or alternatively be configured to create a clone function with a reduced size data structure for a function with an identified candidate for the size reduction. For example, the field of the data structure may include a struct field. In some embodiments, the logic 13 may be located in, or co-located with, various components, including the processor 11 (e.g., on a same die).

The system 10 may implement one or more aspects of the method 30 (FIGS. 3A to 3C), the method 50 (FIG. 5), or any of the embodiments discussed herein. Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, identifying a field of a data structure as a candidate for a size reduction, performing a runtime analysis on the field, reducing the size of the field based on the runtime analysis, etc.).

Figure 2:
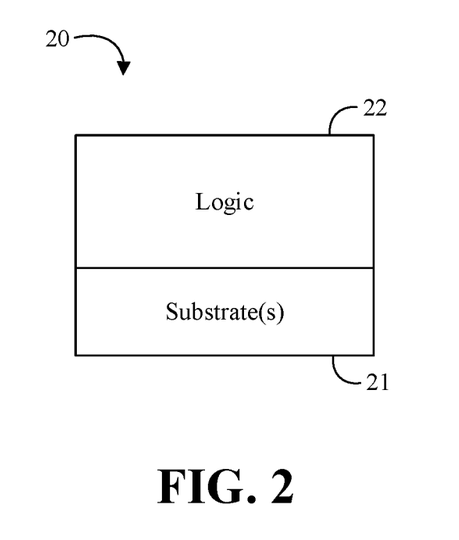
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to identify a field of a data structure as a candidate for a size reduction, perform a runtime analysis on the field, and reduce the size of the field based on the runtime analysis. In some embodiments, the logic 22 may be further configured to perform a runtime range analysis on one or more values assigned to the field. For example, the logic 22 may be configured to determine a minimum value for the one or more values assigned to the field, determine a maximum value for the one or more values assigned to the field, and reduce the size of the field based on the determined minimum and maximum values. In some embodiments, the logic 22 may also be configured to copy the field of the data structure to a reduced size field, and set a flag to indicate that the size of the field of the data structure was reduced. In some embodiments, the logic 22 may additionally or alternatively be configured to create a clone function with a reduced size data structure for a function with an identified candidate for the size reduction. For example, the field of the data structure may include a struct field. In some embodiments, the logic 22 may be located in, or co-located with, various other circuits, logic, or components (e.g., on a same die). In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 30 (FIGS. 3A to 3C), the method 50 (FIG. 5), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
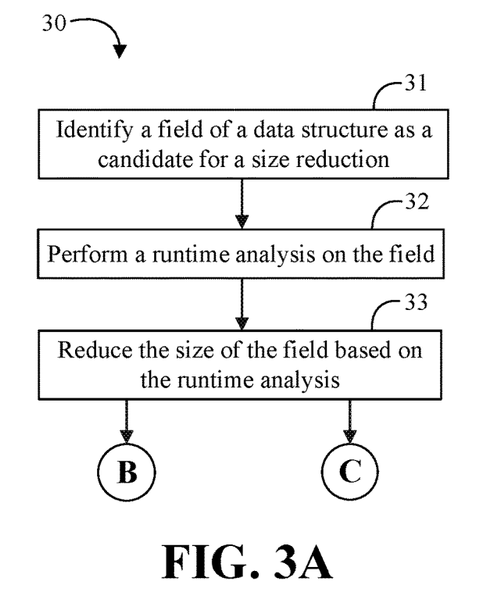
FIGS. 3A to 3C are flowcharts of an example of a method of compiling according to an embodiment.
Figure 3B:
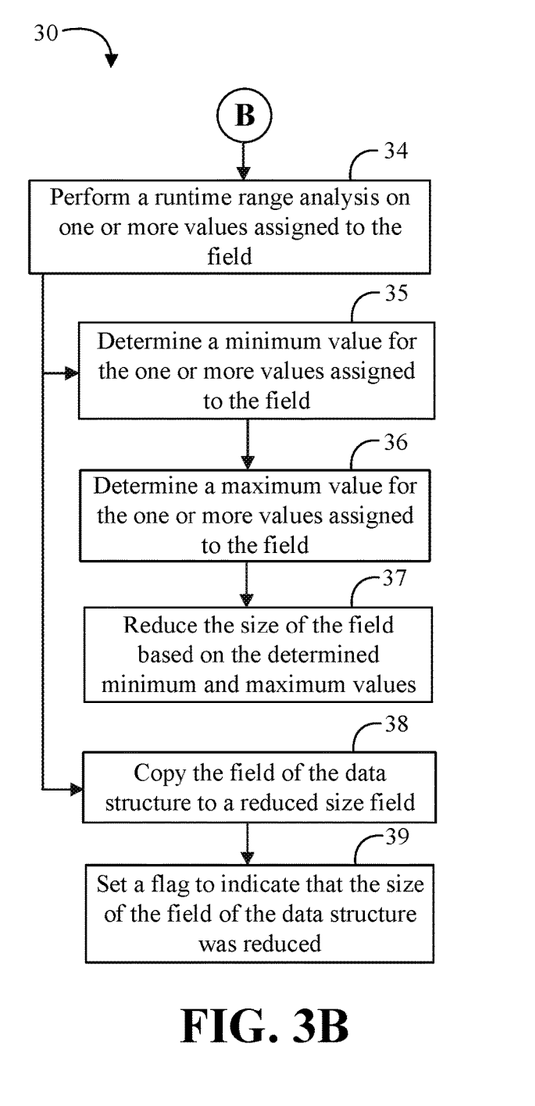
Figure 3C:
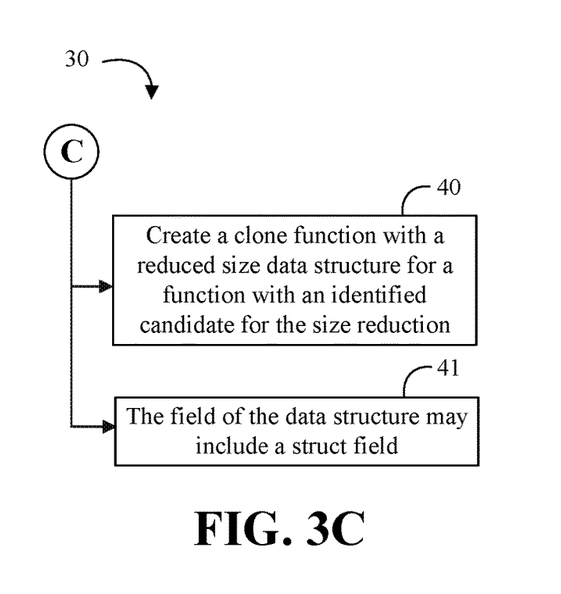

Turning now to FIGS. 3A to 3C, an embodiment of a method 30 of compiling may include identifying a field of a data structure as a candidate for a size reduction at block 31, performing a runtime analysis on the field at block 32, and reducing the size of the field based on the runtime analysis at block 33. Some embodiments of the method 30 may further include performing a runtime range analysis on one or more values assigned to the field at block 34. For example, the method 30 may include determining a minimum value for the one or more values assigned to the field at block 35, determining a maximum value for the one or more values assigned to the field at block 36, and reducing the size of the field based on the determined minimum and maximum values at block 37. The method 30 may also include copying the field of the data structure to a reduced size field at block 38, and setting a flag to indicate that the size of the field of the data structure was reduced at block 39. Some embodiments of the method 30 may additionally or alternatively include creating a clone function with a reduced size data structure for a function with an identified candidate for the size reduction at block 40. For example, the field of the data structure may include a struct field at block 41.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 1 to 6 below. Embodiments or portions of the method 30 may be implemented in firmware, applications (e.g., through an application programming interface (API)), or driver software running on an operating system (OS).

Figure 4:
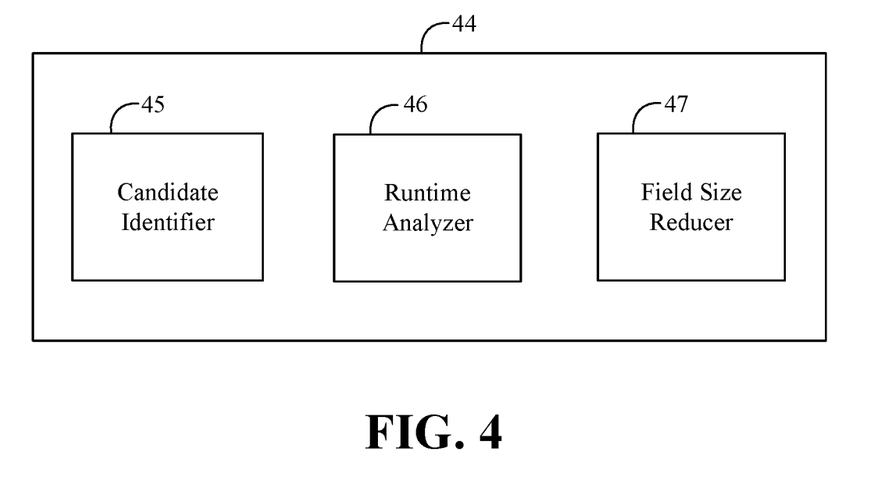
FIG. 4 is a block diagram of an example of a compiler apparatus according to an embodiment.

Turning now to FIG. 4, some embodiments may be physically or logically arranged as one or more modules. For example, an embodiment of a compiler 44 may include a candidate identifier 45, a runtime analyzer 46, and a field size reducer 47. The candidate identifier 45 may include technology to identify a field of a data structure as a candidate for a size reduction. The runtime analyzer 46 may include technology to perform a runtime analysis on the field (e.g., the identified candidate). The field size reducer 47 may include technology to reduce the size of the field based on the runtime analysis. In some embodiments, the runtime analyzer 46 may be further configured to perform a runtime range analysis on one or more values assigned to the field. For example, the runtime analyzer 46 may be configured to determine a runtime minimum value for the one or more values assigned to the field, and to determine a runtime maximum value for the one or more values assigned to the field. The field size reducer 47 may be configured to reduce the size of the field based on the determined minimum and maximum values. In some embodiments, the field size reducer 47 may also be configured to copy the field of the data structure to a reduced size field, and to set a flag to indicate that the size of the field of the data structure was reduced. In some embodiments, the field size reducer 47 may additionally or alternatively be configured to create a clone function with a reduced size data structure for a function with an identified candidate for the size reduction. For example, the field of the data structure may include a struct field.

Embodiments of the candidate identifier 45, the runtime analyzer 46, the field size reducer 47, and other components of the compiler 44, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Some embodiments may advantageously provide technology to reduce the size of C/C++ struct fields with a runtime analysis of a range of values assigned to such fields combined with creation of function clones invoked with a runtime check. In the C programming language, for example, the "struct" keyword may define a data structure type and/or a variable of a structure type. A structure type may be a user-defined composite type which may include fields or members that may have different types. Other programming languages may have other keywords to identify user-defined data structures and/or fields of data structures.

Some embodiments may advantageously reduce a memory footprint to improve performance of a memory bound application. Compilers may adopt a variety of techniques to optimize memory usage in applications. Some techniques may include elimination of unused struct fields, optimizing layout of fields in a struct, and reduction of a size of struct fields through compile time or static analysis of values assigned to such fields. For example, these techniques may improve cache utilization. Compile time and/or static analysis to reduce size of struct fields, however, may fail in cases where values that are unknown at compile time are used to initialize such fields. In one example, an initialization routine may read input data from a file to initialize arrays of struct fields. Because the contents of the data file are not known at compile time, compile time and/or static analysis techniques may be unable to determine if the size of the field may be reduced. Advantageously, some embodiments may provide technology to keep track of the range of values for unknown values assigned to data structure fields (e.g., struct fields) with a combination of function cloning and selection of clone to execute through a runtime check of the range of values.

Some embodiments may analyze assignments to struct fields that are candidates for size optimization by storing the minimum and maximum of all unknown values that are assigned to such candidate fields. At the end of the initialization routine, if the minimum and maximum values for a field can fit in a reduced size field, the data in the original array of structs may be copied over to the new layout of the array of structs with the reduced size field(s) and a flag may be set to indicate that field sizes were reduced. For each function with uses of the candidate fields, a clone may be created where its generated code assumes the struct layout with reduced field sizes combined with checks at the beginning of the clone to simply return after calling the original function if field sizes were not reduced (e.g., as indicated by the flag). Advantageously, some embodiments may provide compiler optimization technology that may reduce memory usage in applications with a runtime range analysis of values that are assigned to struct fields. The reduced memory footprint may improve performance of an application (e.g., especially a memory bound application).

Particular implementations may include various restrictions on when various compiler optimizations may be applied. Because some embodiments may modify a data layout, for example, in some implementations the compiler may need to determine all uses of the data so that all uses may be cloned appropriately (e.g., the compiler may need to determine that the full application code is being compiled). In some embodiments, struct fields whose addresses are taken may not be considered as potential candidates for size reduction (e.g., to simplify the implementation). In some embodiments, any potentially unsafe cast operations on a struct type may make its fields ineligible as candidates for size reduction. Other implementations may avoid one or more of these restrictions.

Figure 5:
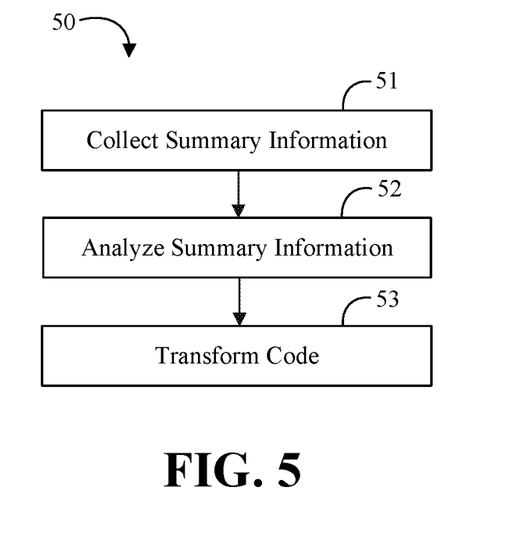
FIG. 5 is a flowchart of another example of a method of compiling according to an embodiment.

Turning now to FIG. 5, an embodiment of a method 50 of compiling may include collecting summary information at block 51, analyzing the summary information at block 52, and transforming code based on the analysis at 53. Some implementations may utilize INTEL C++ COMPILER (ICC) inter procedural optimization (IPO) framework to verify the appropriateness and/or validity for making the code transformation as well for making the actual code transformations. At the summary information collection block 51, information may be collected about struct field uses present in the application code for candidate fields (e.g., fields not already disqualified by other restrictions). Some embodiments may consider struct fields that are 8-byte integers as potential candidates for size reduction and may attempt to reduce their size to 4-bytes. When using the 64-bit compiler, for example, fields defined as long may take up 8-bytes of space. Applications often do not need the full 8-bytes and may work when using 4-bytes for the field. At block 52, analysis of the collected summary information may prove the appropriateness and/or validity of transforming candidate fields. Based on the analysis, for example, fields that do not meet the criteria for reducing size may be invalidated as candidates. The analysis at block 52 may finalize the list of candidate fields and identify the set of functions that may need to be cloned with a runtime check. At block 53, the code transformation may assign a new layout for structs with any candidate fields and may perform the necessary code transformations to ensure that the application still functions correctly using the smaller size fields.

Summary Information Collection Examples

During the summary information collection phase, information may be collected related to candidate field uses. For example, a mapping of fields and the set of functions in which the fields are used may be maintained to determine the set of functions that may need to be cloned. If a field is being assigned a value, some embodiments may check for the following cases and take the noted actions:

- If the value being assigned is a constant, check to see that the value can fit in a 4-byte integer. If not, the field is disregarded as a candidate.
- If the value being assigned is the incoming value of a formal argument to the current function, add a dependency between the formal argument and the field (<field, formal argument> dependency).
- If the value being assigned is the value of another field, add a dependency between the destination and the source field if they are different (<destination field, source field> dependency).
- For any other value being assigned to a field, add information to indicate that an unknown value was assigned to the field in the current function (<field, unknown initialization function> dependency). If an unknown value is assigned to a field in more than one function, the field is disregarded as a candidate.

When a field is disregarded as a candidate, the field may get added to an invalid field set which may be used to avoid gathering further information for such fields.

Some embodiments may also track most or all calls to gather information about actual values used as call parameters. For example, some embodiments may include the following checks:

- If the actual value is a constant, check that it fits in a 4-byte integer. If not, mark the corresponding formal as unknown.
- If the actual value is the value of a field, add a dependency between the corresponding formal and the field.
- For all other cases, mark the corresponding formal as unknown.

Analysis of Summary Information Examples

During the analysis phase, the gathered summary information may be analyzed further to prove the validity for reducing the size of candidate fields. For example, the checks performed may include:

- For any <destination field, source field> dependencies, the destination field is invalidated as a candidate if the source field is not in the candidate set.
- For any <field, formal argument> dependencies, check that the fields on which the formal depends are in the candidate set. If not, the field is invalidated as a candidate.

For a <field, unknown initialization function> dependency, some embodiments may make a simplifying assumption and check that all candidate fields have the same unknown initialization function. Further checks may be done to ensure that the initialization function gets called exactly once from main( ). The initialization function may be treated as the function that sets up the initial values for candidate fields (e.g., an initialization routine).

The set of functions in which candidate field uses are present may be added to the set of functions to clone (e.g., a clone set). Some embodiments may also recursively compute a set of callers of functions in the clone set and add the callers to the clone set. The initialization routine and main( ) functions may be excluded from the clone set. Some embodiments may avoid any of the functions in the clone set from being inlined into main( ) because main( ) does not get cloned.

Code Transformation Examples

The code transformation phase may transform the application code to work correctly after reducing the size of one or more fields in the candidate set. Some embodiments may perform the following code transformations:

- To start with, new field offsets may be assigned to fields in the candidate set.
- The initialization routine may be subjected to the following transformations:
  - Whenever an unknown value is assigned to a field in the candidate set, the value is used to update the minimum and the maximum unknown values used to initialize some field in the candidate set.
  - At the end of the initialization routine, if the range of values [minimum unknown, maximum unknown] fits in a 4-byte integer a flag used to indicate that field size reduction happened may be set to 1. The flag may have an initial value of zero. Data also gets copied over from the old struct layout to new struct layout for affected struct types.
- The set of functions in the clone set may contain the same code as in the original except for the following changes. A check is added at the beginning of the clone to check if field size reduction did not happen. If it did not, the clone function simply returns after making a call to the original function.
- Uses of fields in the candidate set are modified to use the new field offsets from the reduced size struct layout.
- Replacing uses of functions in the clone set with uses of the corresponding clone in the original application code.

An example of how some embodiments identify candidates, analyze the identified candidates, and reduce the size of the struct fields may be better understood with reference to the following sample original application code:

```
#include <stdlib.h>
#include <stdio.h>
struct data {
    long f1, f2, f3;
} *data_arr, *data_arr2;
long sum = 0;
void read_data( ) {
    FILE *fp;
    int index;
    long f1, f2, f3;
    data_arr = calloc(100, sizeof(struct data));
    if (!data_arr) exit(1);
    fp = fopen("data.file", "r");
    if (!fp) exit(1);
    for (index = 0; index < 100; ++index) {
        fscanf(fp, "%ld %ld\n", &f1, &f2);
        data_arr[index].f1 = f1;
        data_arr[index].f2 = f2;
        data_arr[index].f3 = f2;
    }
    fclose(fp);
}
void process_data(long val)
{
    int index;
    data_arr2 = calloc(50, sizeof(struct data));
    for (index = 0; index < 50; ++index) {
        sum += data_arr[index].f2;
        data_arr2[index].f1 = data_arr[index].f2 + val;
        data_arr2[index].f3 = data_arr[index].f2;
        data_arr2[index].f2 = val;
    }
}
int process( ) {
    process_data(data_arr[0].f3);
    printf("Sum f2: %ld, %ld\n", sum, data_arr2[40].f3);
    return 0;
}
int main( ) {
    read_data( );
    process( );
}
```

Some embodiments may start out by treating the fields f1, f2, and f3 of struct type data_array as potential candidates. The field assignments in read_data may cause <f1, read_data>, <f2, read_data> and <f3, read_data> to be marked as <field, unknown initialization function> dependencies. The assignment to field f1 in process_data may be treated as an unknown assignment and because the unknown assignment happens for this field happens in more than one function, field f1 may be disregarded as a candidate leaving fields {f2, f3} as possible candidates. The assignment to field f3 in process_data may cause <f3, f2> to be added as a <destination field, source_field> dependency. The assignment to field f2 in process_data may cause <f2, val> to be added as a <field, formal argument> dependency. Some embodiments may record use of fields in functions (<f2, process_data>, <f3, process_data>, and <f3, process>). The call to process_data may cause <val, f3> to be added as a <formal, field> dependency.

At analysis time, the following analysis may be performed (e.g., and corresponding actions may be taken). The <f3, f2> dependency does not cause f3 to be disregarded as a candidate because the field f2 is in the candidate set. The <f2, val> dependency does not cause f2 to be disregarded as a candidate because the field f3 in <val, f3> dependency is in the candidate set. The clone set may consist of the functions {process_data, process} and the final candidate set for field size reduction may contain the fields <f2, f3>. The minimum and maximum unknown values assigned to candidate fields in read_data may be tracked.

Based on the analysis, the following changes may be made in the transformed application code. The minimum and maximum values may be checked to see if they fit in a 4-byte integer. If so, data may be copied to the new struct layout, and the flag may be set to indicate that field sizes were reduced. New function clones nominally named process_clone and process_data_clone may be created. The clones may have an early check to call the original function and return if needed. The clones may use the new struct layout for any uses of struct fields in the candidate set. All uses of the functions in the clone set may be replaced with a use of the corresponding clone in the original application code. These changes may be noted in the below example transformed code in the function main( ) where the call to process is replaced with a call to process_clone and in the function process( ) where the call to process_data is replaced with a call to process_data_clone.

The transformed code equivalent for the sample original application code after applying the compiler optimization in accordance with some embodiments may be as follows:

```
----
#include <stdlib.h>
#include <stdio.h>
#include <limits.h>
struct data {
    long f1, f2, f3;
} *data_arr, *data_arr2;
struct data_new {
    long f1;
    int f2, f3;
};
long sum = 0;
long min_val = INT_MAX;
long max_val = INT_MIN;
unsigned char shrink_happened = 0;
void read_data( ) {
    FILE *fp;
    int index;
    long f1, f2, f3;
    data_arr = calloc(100, sizeof(struct data));
    if (!data_arr) exit(1);
    fp = fopen("data.file", "r");
    if (!fp) exit(1);
    for (index = 0; index < 100; ++index) {
        fscanf(fp, "%ld %ld\n", &f1, &f2);
        data_arr[index].f1 = f1;
        data_arr[index].f2 = f2;
        data_arr[index].f3 = f2;
        max_val = f2 > max_val ? f2 : max_val;
        min_val = f2 < min_val ? f2 : min_val;
    }
    fclose(fp);
    if (max_val <= INT_MAX && min_val >= INT_MIN) {
        struct data_new *tptr;
        tptr = (struct data_new *) data_arr;
        for (index = 0; index < 100; ++index) {
            long f1;
            int f2, f3;
            f1 = data_arr[index].f1;
            f2 = data_arr[index].f2;
            f3 = data_arr[index].f3;
```

-continued

```
            tptr[index].f1 = f1;
            tptr[index].f2 = f2;
            tptr[index].f3 = f3;
        }
        shrink_happened = 1;
    }
}
-----
-----
void process_data(long val)
{
    int index;
    data_arr2 = calloc(50, sizeof(struct data));
    for (index = 0; index < 50; ++index) {
        sum += data_arr[index].f2;
        data_arr2[index].f1 = data_arr[index].f2 + val;
        data_arr2[index].f3 = data_arr[index].f2;
        data_arr2[index].f2 = val;
    }
}
int process( ) {
    process_data(data_arr[0].f3);
    printf("Sum f2: %ld, %ld\n", sum, data_arr2[40].f3);
    return 0;
}
void process_data_clone(long val)
{
    int index;
    struct data_new *tdata_arr, *tdata_arr2;
    if (shrink_happened == 0) {
        process_data(val);
        return;
    }
    tdata_arr = (struct data_new *) data_arr;
    data_arr2 = calloc(50, sizeof(struct data));
    tdata_arr2 = (struct data_new *) data_arr2;
    for (index = 0; index < 50; ++index) {
        sum += tdata_arr[index].f2;
        tdata_arr2[index].f1 = tdata_arr[index].f2 + val;
        tdata_arr2[index].f3 = tdata_arr[index].f2;
        tdata_arr2[index].f2 = val;
    }
}
int process_clone( ) {
    if (shrink_happened == 0) {
        return process( );
    }
    process_data_clone(((struct data_new *)data_arr)[0].f3);
    printf("Sum f2: %ld, %ld\n", sum, ((struct data_new
        *)data_arr2)[40].f3);
    return 0;
}
int main( ) {
    read_data( );
    process_clone( );
}
-----
```

Figure 6A:
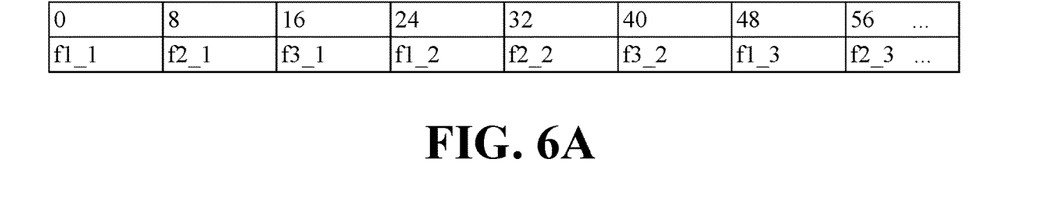
FIGS. 6A to 6B are illustrative diagrams of examples of data structures according to an embodiment.
Figure 6B:
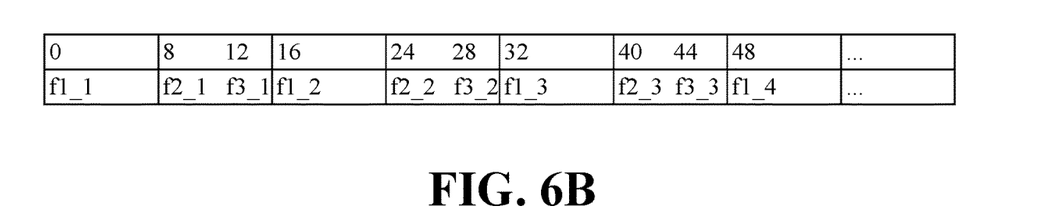

FIG. 6A illustrates an embodiment of an array of structures (AOS) layout of struct data before compiler optimization in accordance with an embodiment, and FIG. 6B illustrates the AOS layout of struct data after applying the compiler optimization with byte offset in accordance with an embodiment. As shown in FIG. 6B, the size of the data structure may be advantageously reduced in accordance with some embodiments.

Figure 7A:
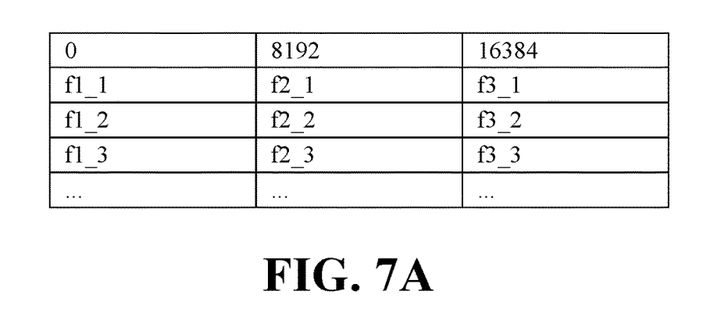
FIGS. 7A to 7B are illustrative diagrams of other examples of data structures according to an embodiment.
Figure 7B:
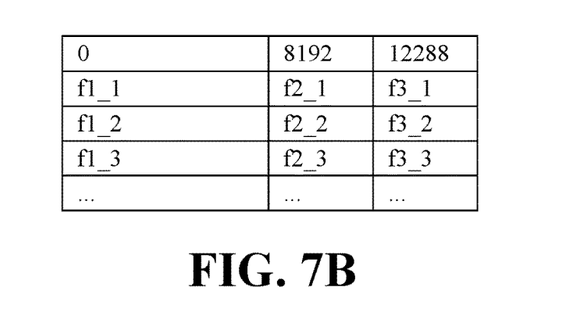

FIG. 7A illustrates an embodiment of a structure of arrays (SOA) layout of struct data before compiler optimization in accordance with an embodiment, and FIG. 7B illustrates the SOA layout of struct data after applying the compiler optimization with byte offset in accordance with an embodiment. As shown in FIG. 7B, the size of the data structure may be advantageously reduced in accordance with some embodiments.

Some compilers may transform AOS to a SOA to improve cache locality. Some embodiments may work with the SOA layout to transform the layout (e.g., as shown in FIGS. 7A to 7B below). When applying an AOS to SOA transformation, it may also be possible to replace pointers to struct types that are transformed to an integer element index into the array (e.g., PTRTOINT). For example, using the integer index element may improve performance if the integer index occupies fewer bytes than a pointer would. Some embodiments may also be extended to dynamically check for the maximum possible value of such PTRTOINT indices and use smaller integer types where applicable.

For the layout of the sample original application code discussed above (e.g., FIGS. 6A and 7A), the layout changes for the sample transformed code (e.g., FIGS. 6B and 7B) show the field occurrence of the nth array element as fieldname_n. For example, "f2_3" refers to the field f2 in the third array element. The change in layout for the SOA case in FIG. 7B may assume that the SOA layout allocates multiples of 1024 elements and divides the struct array into 1024-element chunks. Both FIGS. 6B and 7B show memory usage being reduced after applying the compiler optimization in accordance with an embodiment, advantageously reducing the memory footprint.

Figure 8A:
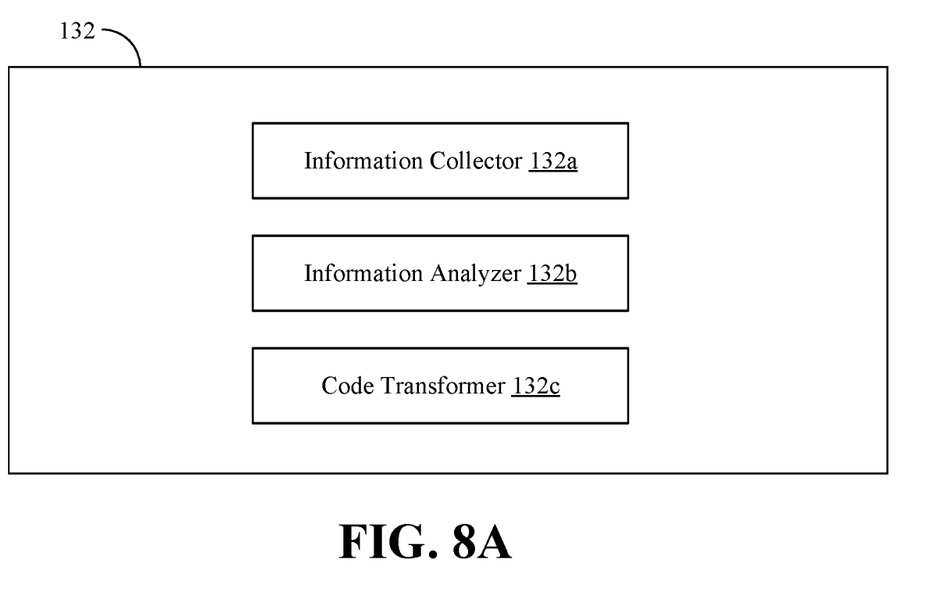
FIGS. 8A and 8B are block diagrams of examples of compiler apparatuses according to embodiments.

FIG. 8A shows a compiler apparatus 132 (132a-132c) that may implement one or more aspects of the method 30 (FIGS. 3A to 3C) and/or the method 50 (FIG. 5). The compiler apparatus 132, which may include logic instructions, configurable logic, fixed-functionality hardware logic, may be readily substituted for the compiler 44 (FIG. 4), already discussed. An information collector 132a may collect summary information related to the use of struct fields to identify candidates for a field size reduction. An information analyzer 132b may analyze the summary information to finalize the identified candidates for the size reduction. A code transformer 132c may transform the code as needed to reduce the size of the candidate fields. For example, the information collector 132a, the information analyzer 132b, and/or the code transformer 132c may include technology as discussed in any of the examples herein.

Figure 8B:
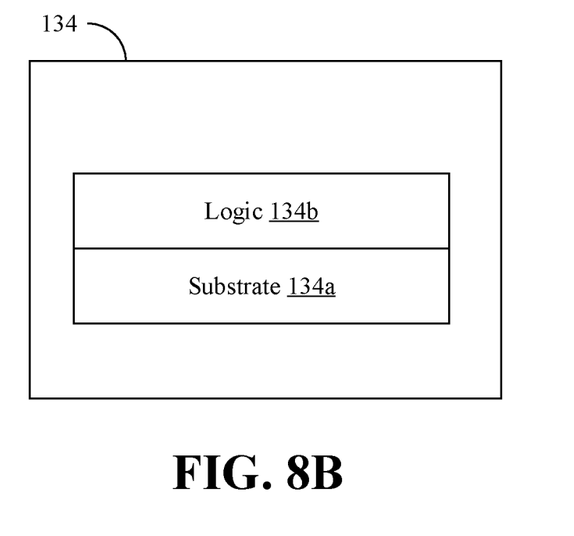

Turning now to FIG. 8B, compiler apparatus 134 (134a, 134b) is shown in which logic 134b (e.g., transistor array and other integrated circuit/IC components) is coupled to a substrate 134a (e.g., silicon, sapphire, gallium arsenide). The logic 134b may generally implement one or more aspects of the method 30 (FIGS. 3A to 3C) and/or the method 50 (FIG. 5). Thus, the logic 134b may collect summary information related to the use of struct fields to identify candidates for a field size reduction, analyze the summary information to finalize the identified candidates for the size reduction, and transform the code as needed to reduce the size of the candidate fields. In one example, the apparatus 134 is a semiconductor die, chip and/or package.

Figure 9:
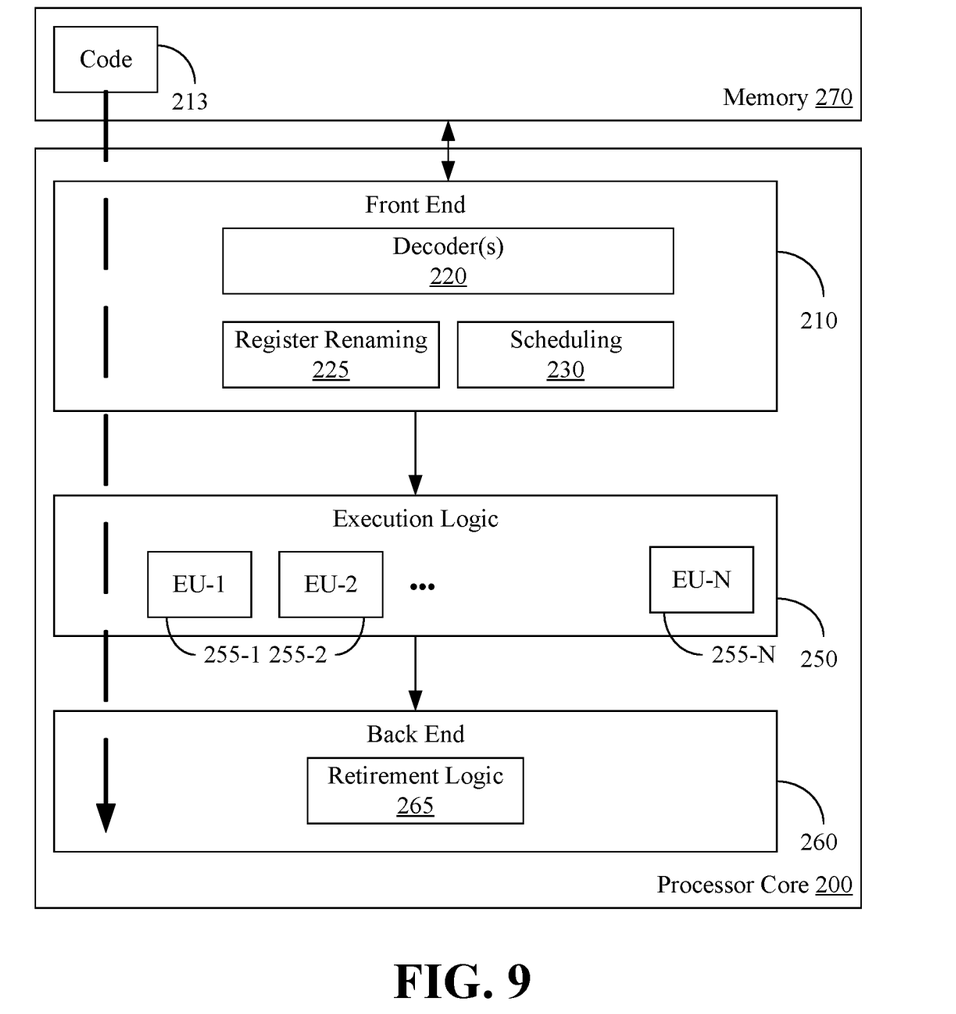
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 30 (FIGS. 3A to 3C) and/or the method 50 (FIG. 5), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 10:
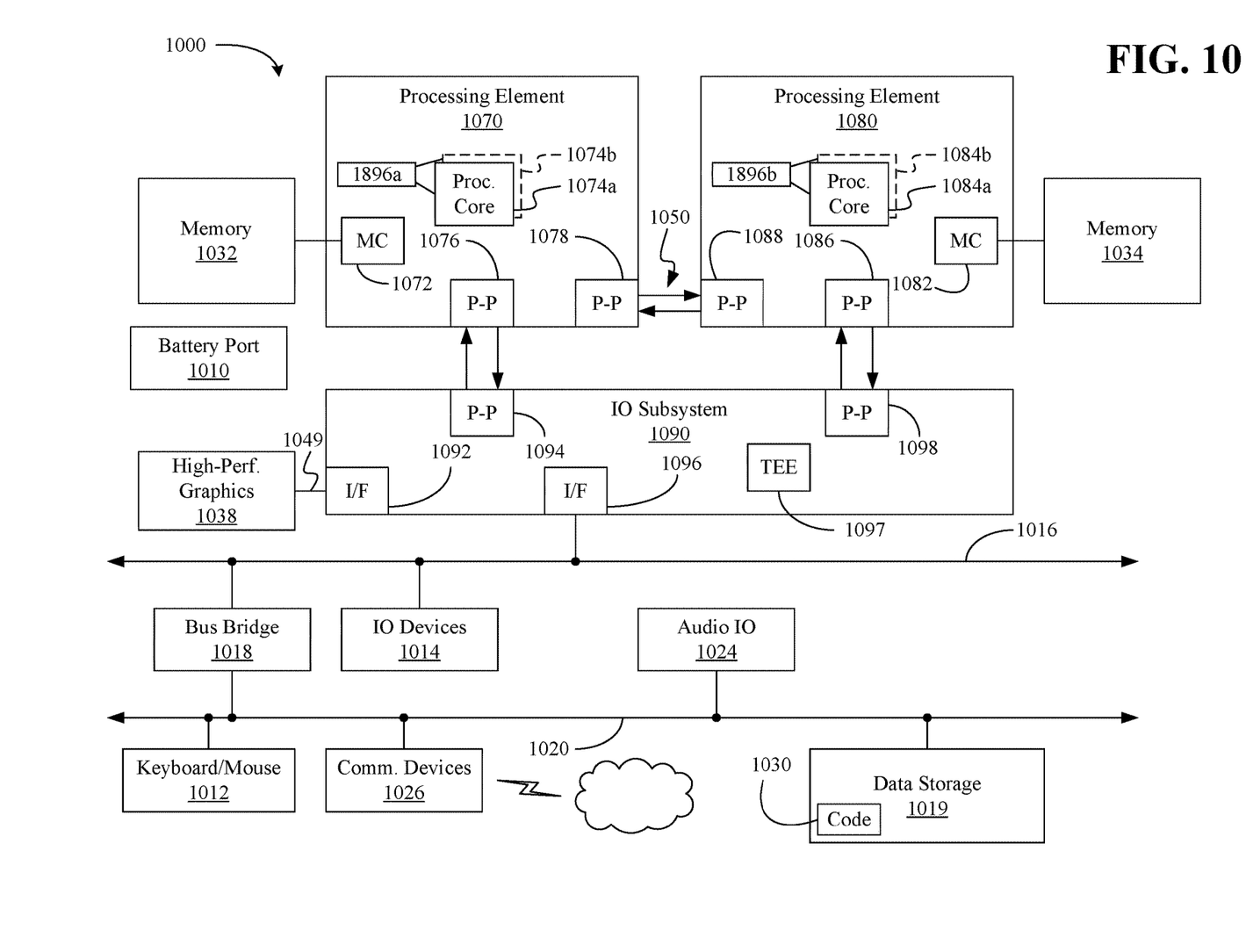
FIG. 10 is a block diagram of an example of a system according to an embodiment.

Referring now to FIG. 10, shown is a block diagram of a system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 9.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes a TEE 1097 (e.g., security controller) and P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement one or more aspects of the method 30 (FIGS. 3A to 3C) and/or the method 50 (FIG. 5), already discussed, and may be similar to the code 213 (FIG. 9), already discussed. Further, an audio I/O 1024 may be coupled to second bus 1020.

Note that other embodiments are contemplated. For example, instead of the point-to-point architecture of FIG. 10, a system may implement a multi-drop bus or another such communication topology.

ADDITIONAL NOTES AND EXAMPLES

Example 1 may include at least one computer readable medium, comprising a set of instructions, which when executed by a computing device, cause the computing device to identify a field of a data structure as a candidate for a size reduction, perform a runtime analysis on the field, and reduce the size of the field based on the runtime analysis.

Example 2 may include the at least one computer readable medium of Example 1, comprising a further set of instructions, which when executed by the computing device, cause the computing device to perform a runtime range analysis on one or more values assigned to the field.

Example 3 may include the at least one computer readable medium of Example 2, comprising a further set of instructions, which when executed by the computing device, cause the computing device to determine a minimum value for the one or more values assigned to the field, determine a maximum value for the one or more values assigned to the field, and reduce the size of the field based on the determined minimum and maximum values.

Example 4 may include the at least one computer readable medium of Example 2, comprising a further set of instructions, which when executed by the computing device, cause the computing device to copy the field of the data structure to a reduced size field, and set a flag to indicate that the size of the field of the data structure was reduced.

Example 5 may include the at least one computer readable medium of Example 1, comprising a further set of instructions, which when executed by the computing device, cause the computing device to create a clone function with a reduced size data structure for a function with an identified candidate for the size reduction.

Example 6 may include the at least one computer readable medium of any of Examples 1 to 5, wherein the field of the data structure comprises a struct field.

Example 7 may include a compiler, comprising means for identifying a field of a data structure as a candidate for a size reduction, means for performing a runtime analysis on the field, and means for reducing the size of the field based on the runtime analysis.

Example 8 may include the compiler of Example 7, further comprising means for performing a runtime range analysis on one or more values assigned to the field.

Example 9 may include the compiler of Example 8, further comprising means for determining a minimum value for the one or more values assigned to the field, means for determining a maximum value for the one or more values assigned to the field, and means for reducing the size of the field based on the determined minimum and maximum values.

Example 10 may include the compiler of Example 8, further comprising means for copying the field of the data structure to a reduced size field, and means for setting a flag to indicate that the size of the field of the data structure was reduced.

Example 11 may include the compiler of Example 7, further comprising means for creating a clone function with a reduced size data structure for a function with an identified candidate for the size reduction.

Example 12 may include the compiler of any of Examples 7 to 11, wherein the field of the data structure comprises a struct field.

Example 13 may include a compiler, comprising means for collecting summary information, mean for analyzing the summary information, and means for transforming code based on the analysis.

Example 14 may include the compiler of Example 13, further comprising means for collecting information related to struct field uses present in application code for candidate fields.

Example 15 may include the compiler of Example 13, further comprising means for proving the validity of transforming candidate fields.

Example 16 may include the compiler of Example 15, further comprising means for invalidating candidate fields that do not meet a criterion for reducing size of the candidate field.

Example 17 may include the compiler of Example 15, further comprising means for finalizing a list of candidate fields, and means for identifying a set of functions to clone corresponding to the finalized list.

Example 18 may include the compiler of any of Examples 13 to 17, further comprising means for assigning a new layout for a struct field with a candidate field.

Example 19 may include the compiler of Example 18, further comprising means for performing a code transformation to ensure that the transformed code still functions correctly using the smaller size fields.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
    a processor;
    memory communicatively coupled to the processor; and
    logic communicatively coupled to the processor to:
        identify a field of a data structure as a candidate for a size reduction,
        perform a runtime analysis on the field to determine a minimum value assigned to the field and a maximum value assigned to the field,
        determine whether the minimum value and the maximum value are fittable into a reduced size field, and
        based on the runtime analysis and in response to the minimum value and the maximum value being determined to be fittable into the reduced size field, reduce a size of the field to the reduced size field and clone or more functions to execute based on new offsets associated with the reduced size field.

2. The system of claim 1, wherein the logic is further to:
    perform a runtime range analysis on one or more values assigned to the field.

3. The system of claim 2, wherein the logic is further to:
    copy the field of the data structure to the reduced size field; and
    set a flag to indicate that the size of the field of the data structure was reduced.

4. The system of claim 1, wherein the logic is further to:
create a clone function with a reduced size data structure for a function with an identified candidate for the size reduction.

5. The system of claim 1, wherein the field of the data structure comprises a struct field.

6. The system of claim 1, wherein the logic is further to:
in response to the minimum value and the maximum value being determined to not be fittable into the reduced size field, set a flag to a first value and clone one or more original functions to generate one or more cloned functions that are to include a call to the one or more original functions; and
in response to the minimum value and the maximum value being determined to be fittable into the reduced size field, set the flag to a second value, wherein the second value is different from the first value.

7. A semiconductor package apparatus, comprising:
one or more substrates; and
logic coupled to the one or more substrates, wherein the logic is at least partly implemented in one or more of configurable logic or fixed-functionality logic hardware, the logic coupled to the one or more substrates to:
identify a field of a data structure as a candidate for a size reduction,
perform a runtime analysis on the field to determine a minimum value assigned to the field and a maximum value assigned to the field,
determine whether the minimum value and the maximum value are fittable into a reduced size field, and
based on the runtime analysis and in response to the minimum value and the maximum value being determined to be fittable into the reduced size field, reduce a size of the field to the reduced size field and clone or more functions to execute based on new offsets associated with the reduced size field.

8. The apparatus of claim 7, wherein the logic is further to:
perform a runtime range analysis on one or more values assigned to the field.

9. The apparatus of claim 8, wherein the logic is further to:
copy the field of the data structure to the reduced size field; and
set a flag to indicate that the size of the field of the data structure was reduced.

10. The apparatus of claim 7, wherein the logic is further to:
create a clone function with a reduced size data structure for a function with an identified candidate for the size reduction.

11. The apparatus of claim 7, wherein the field of the data structure comprises a struct field.

12. The apparatus of claim 7, wherein the logic coupled to the one or more substrates includes transistor channel regions that are positioned within the one or more substrates.

13. The apparatus of claim 7, wherein the logic is further to:
in response to the minimum value and the maximum value being determined to not be fittable into the reduced size field, set a flag to a first value and clone one or more original functions to generate one or more cloned functions that are to include a call to the one or more original functions; and
in response to the minimum value and the maximum value being determined to be fittable into the reduced size field, set the flag to a second value, wherein the second value is different from the first value.

14. A method of compiling, comprising:
identifying a field of a data structure as a candidate for a size reduction;
performing a runtime analysis on the field to determine a minimum value assigned to the field and a maximum value assigned to the field;
determining whether the minimum value and the maximum value are fittable into a reduced size field; and
based on the runtime analysis and in response to the minimum value and the maximum value being determined to be fittable into the reduced size field, reducing a size of the field to the reduced size field and cloning or more functions to execute based on new offsets associated with the reduced size field.

15. The method of claim 14, further comprising:
performing a runtime range analysis on one or more values assigned to the field.

16. The method of claim 15, further comprising:
copying the field of the data structure to the reduced size field; and
setting a flag to indicate that the size of the field of the data structure was reduced.

17. The method of claim 14, further comprising:
creating a clone function with a reduced size data structure for a function with an identified candidate for the size reduction.

18. The method of claim 14, wherein the field of the data structure comprises a struct field.

19. The method of claim 14, further comprising:
in response to the minimum value and the maximum value being determined to not be fittable into the reduced size field, setting a flag to a first value and cloning one or more original functions to generate one or more cloned functions that are to include a call to the one or more original functions; and
in response to the minimum value and the maximum value being determined to be fittable into the reduced size field, setting the flag to a second value, wherein the second value is different from the first value.

20. At least one non-transitory computer readable medium, comprising a set of instructions, which when executed by a computing device, cause the computing device to:
identify a field of a data structure as a candidate for a size reduction;
perform a runtime analysis on the field to determine a minimum value assigned to the field and a maximum value assigned to the field;
determine whether the minimum value and the maximum value are fittable into a reduced size field; and
based on the runtime analysis and in response to the minimum value and the maximum value being determined to be fittable into the reduced size field, reduce a size of the field to the reduced size field and clone or more functions to execute based on new offsets associated with the reduced size field.

21. The at least one non-transitory computer readable medium of claim 20, comprising a further set of instructions, which when executed by the computing device, cause the computing device to:
perform a runtime range analysis on one or more values assigned to the field.

22. The at least one non-transitory computer readable medium of claim 21, comprising a further set of instructions, which when executed by the computing device, cause the computing device to:
- copy the field of the data structure to the reduced size field; and
- set a flag to indicate that the size of the field of the data structure was reduced.

23. The at least one non-transitory computer readable medium of claim 20, comprising a further set of instructions, which when executed by the computing device, cause the computing device to:
- create a clone function with a reduced size data structure for a function with an identified candidate for the size reduction.

24. The at least one non-transitory computer readable medium of claim 20, wherein the field of the data structure comprises a struct field.

25. The at least one non-transitory computer readable medium of claim 20, comprising a further set of instructions, which when executed by the computing device, cause the computing device to:
- in response to the minimum value and the maximum value being determined to not be fittable into the reduced size field, set a flag to a first value and clone one or more original functions to generate one or more cloned functions that are to include a call to the one or more original functions; and
- in response to the minimum value and the maximum value being determined to be fittable into the reduced size field, set the flag to a second value, wherein the second value is different from the first value.

* * * * *